UNITED STATES PATENT OFFICE.

JOHN W. HYATT AND ISAIAH S. HYATT, OF NEWARK, N. J., ASSIGNORS TO THE CELLULOID MANUFACTURING COMPANY, OF NEW YORK, N. Y.

IMPROVEMENT IN THE MANUFACTURE OF CELLULOID.

Specification forming part of Letters Patent No. 156,353, dated October 27, 1874; application filed October 13, 1874.

*To all whom it may concern:*

Be it known that we, JOHN W. HYATT and ISAIAH SMITH HYATT, of Newark, in the county of Essex and State of New Jersey, have invented an Improvement in the Manufacture of Celluloid, of which the following is a specification:

In our reissued Letters Patent No. 5,928, granted June 23, 1874, camphor is set forth as a solvent of pyroxyline when the same is subjected to intimate mixture, and then to heat and pressure. Our present invention is made for lessening the quantity of camphor or equivalent solvent made use of; also, the degree of heat required in the manufacture of celluloid.

We prepare a compound pulp composed of pyroxyline, gum-camphor, &c., as described in the said above-named reissued Letters Patent, but in different proportions, the proportions suited to this new process being about one hundred (100) parts of dry pyroxyline and from twenty-five (25) to forty (40) parts of gum-camphor, (varying with the consistency required in the finished product,) together with such coloring or other material as may be desired.

When these ingredients are thoroughly intermixed, as set forth in such reissued Letters Patent, and the aqueous moisture expelled therefrom, which may be advantageously accomplished by the plan set forth in our Letters Patent of Nov. 19, 1872, and numbered 133,229, from twenty (20) to forty (40) per cent. of alcohol is added, and the whole mass kept within a closed vessel until the alcohol is evenly diffused throughout all its parts, the proportions named in the reissued Letters Patent referred to being one hundred parts of dry pyroxyline to fifty parts of gum-camphor. After this even diffusion the mass is well masticated between rollers heated to 135° Fahrenheit. The particles of pyroxyline and other materials, such as coloring matter, are brought intimately into contact with the camphor by the action of the alcohol and the mastication, and a semi-transformation takes place, and the material is in a better condition for the final heating and converting process, so that from fifty to seventy-five degrees less heat is required to complete the transformation of the pyroxyline and solvents into celluloid than is required where no alcohol is used.

Nitrous ether and some other solvents of gum-camphor may be substituted for alcohol in this process.

We claim as our invention—

The process herein set forth of manufacturing celluloid by the addition to the mass composed of pyroxyline and camphor of a solvent of camphor, in about the proportion set forth, and previous to mastication, heat, and pressure.

Signed by us this 7th day of October, 1874.

JOHN W. HYATT.
I. SMITH HYATT.

Witnesses:
MURRAY LIVINGSTON,
OSCAR L. LEFFERTS.